United States Patent
Degrendel et al.

(10) Patent No.: US 7,342,423 B2
(45) Date of Patent: Mar. 11, 2008

(54) CIRCUIT AND METHOD FOR CALCULATING A LOGICAL COMBINATION OF TWO INPUT OPERANDS

(75) Inventors: Antoine Degrendel, Munich (DE); Winfried Kamp, Munich (DE)

(73) Assignee: Infineon Technologies AG (DE)

( * ) Notice: Subject to any disclaimer, the term of this patent is extended or adjusted under 35 U.S.C. 154(b) by 11 days.

(21) Appl. No.: 11/463,190

(22) Filed: Aug. 8, 2006

(65) Prior Publication Data

US 2007/0035332 A1   Feb. 15, 2007

(30) Foreign Application Priority Data

Aug. 8, 2005   (DE) ............... 10 2005 037 355

(51) Int. Cl.
H03K 19/20 (2006.01)
H03K 19/094 (2006.01)
H03K 19/096 (2006.01)

(52) U.S. Cl. ............... 326/112; 326/93; 326/98; 326/114; 326/115; 326/121

(58) Field of Classification Search ............ 326/93–98, 326/112, 114–115, 119, 121
See application file for complete search history.

(56) References Cited

U.S. PATENT DOCUMENTS

| | | | | |
|---|---|---|---|---|
| 6,043,674 | A * | 3/2000 | Sobelman | 326/35 |
| 6,066,965 | A * | 5/2000 | Blomgren et al. | 326/95 |
| 6,509,761 | B2 * | 1/2003 | Taki | 326/112 |
| 6,717,438 | B2 * | 4/2004 | Choe | 326/83 |
| 2002/0101262 | A1 | 8/2002 | Taki | |

FOREIGN PATENT DOCUMENTS

DE   103 44 647 B3   2/2005

OTHER PUBLICATIONS

Stefan Mangard, et al., "Side-Channel Leakage of Masked CMOS Gates," Institute for Applied Information Processing and Communications, Graz, Austria, Feb. 18, 2005.

Thomas Popp, et al., "Masked Dual-Rail Pre-Charge Logic: DPA-Resistant Circuits without Routing Constraints," Institute for Applied Information Processing and Communications, Graz, Austria, Feb. 11, 2005.

* cited by examiner

*Primary Examiner*—Rexford Barnie
*Assistant Examiner*—Jason Crawford
(74) *Attorney, Agent, or Firm*—Dickstein, Shapiro, LLP.

(57) ABSTRACT

A circuit for calculating a logical combination of two input operands includes a first input for receiving a first dual rail signal having data values of the first input in a calculation cycle and precharge values in a precharge cycle, a second input for receiving a second dual rail signal having data values of the second input in the calculation cycle and precharge values in the precharge cycle, and an output for outputting a third dual rail signal having result values in the calculation cycle and precharge values in the precharge cycle. Furthermore, the circuit has a logic circuit for determining the result values according to the logical combination from the data values of the first input and the second input and for outputting the result values in the calculation cycle at the output, and a precharge circuit designed to impress precharge values in the output already when precharge values are detected at a single input, or designed to terminate impressing the precharge values only when the first dual rail signal and the second dual rail signal have data values.

13 Claims, 9 Drawing Sheets

| 2 input function | A | AN | B | BN | Z | ZN |
|---|---|---|---|---|---|---|
| idle state | 0 | 0 | dc | dc | 0 | 0 |
| idle state | dc | dc | 0 | 0 | 0 | 0 |

FIG 4B

| 3 input function | A | AN | B | BN | C | CN | Z | ZN |
|---|---|---|---|---|---|---|---|---|
| idle state | 0 | 0 | dc | dc | dc | dc | 0 | 0 |
| idle state | dc | dc | 0 | 0 | dc | dc | 0 | 0 |
| idle state | dc | dc | dc | dc | 0 | 0 | 0 | 0 |

FIG 4C

| AND function | A | AN | B | BN | Z | ZN |
|---|---|---|---|---|---|---|
| idle state | 0 | 0 | 0 | 0 | 0 | 0 |
| idle state | 0 | 0 | dc | dc | 0 | 0 |
| idle state | dc | dc | 0 | 0 | 0 | 0 |
| A/B=0/0 | 0 | 1 | 0 | 1 | 0 | 1 |
| A/B=0/1 | 0 | 1 | 1 | 0 | 0 | 1 |
| A/B=1/0 | 1 | 0 | 0 | 1 | 0 | 1 |
| A/B=1/1 | 1 | 0 | 1 | 0 | 1 | 0 |

| A | B | Z |
|---|---|---|
| 0 | 0 | 0 |
| 0 | 1 | 0 |
| 1 | 0 | 0 |
| 1 | 1 | 1 |

FIG 14B
prior art

| AND function | A | AN | B | BN | Z | ZN |
|---|---|---|---|---|---|---|
| idle state | 0 | 0 | 0 | 0 | 0 | 0 |
| A/B=0/0 | 0 | 1 | 0 | 1 | 0 | 1 |
| A/B=0/1 | 0 | 1 | 1 | 0 | 0 | 1 |
| A/B=1/0 | 1 | 0 | 0 | 1 | 0 | 1 |
| A/B=1/1 | 1 | 0 | 1 | 0 | 1 | 0 |

CIRCUIT AND METHOD FOR CALCULATING A LOGICAL COMBINATION OF TWO INPUT OPERANDS

CROSS-REFERENCE TO RELATED APPLICATIONS

This application claims priority from German Patent Application No. 10 2005 037 355.0, which was filed on Aug. 8, 2005, and is incorporated herein by reference in its entirety.

BACKGROUND

The present invention relates to a circuit and a method for calculating a logical combination of two input operands that may particularly be used for security-relevant applications.

Circuits used for processing security-relevant data are designed, if possible, so that the data to be processed are protected against attackers attempting to obtain the security-relevant data by an analysis of the circuit. Due to SPA/DPA attacks (SPA/DPA=simple power attack/differential power attack), it is necessary for high security applications to arrange the power consumption of an integrated circuit independent of the processed data.

These problems may be solved by a dynamic dual rail circuit technology whose design, characterization and verification is, however, time consuming. Due to the precharge signals required for a precharge state between the data states, a library based on the dynamic dual rail circuit technology is not synthesizable and is not suitable for static timing analyses.

A static implementation of a circuitry for processing two dual rail signals is known. Here, the dual rail signals comprise precharge signals with precharge values between valid data values. Valid data values are characterized in that there are logic states respectively inverted with respect to each other on both individual signals of the dual rail signal. Precharge values are characterized in that there are the same logic states on the two signals of a dual rail signal. According to the patent document, the precharge values present at the inputs of the circuitry are passed to an output of the circuitry.

Figure 14A:
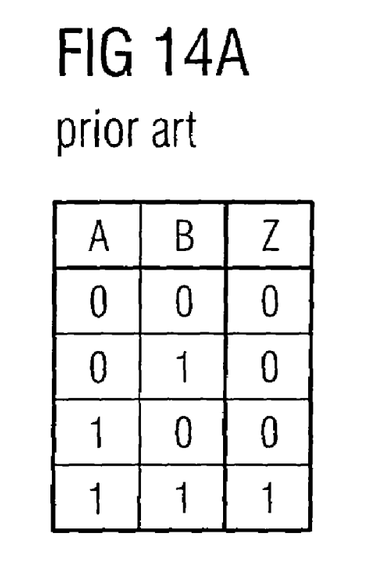
FIGS. 14a and 14b show known value tables.
Figure 14B:
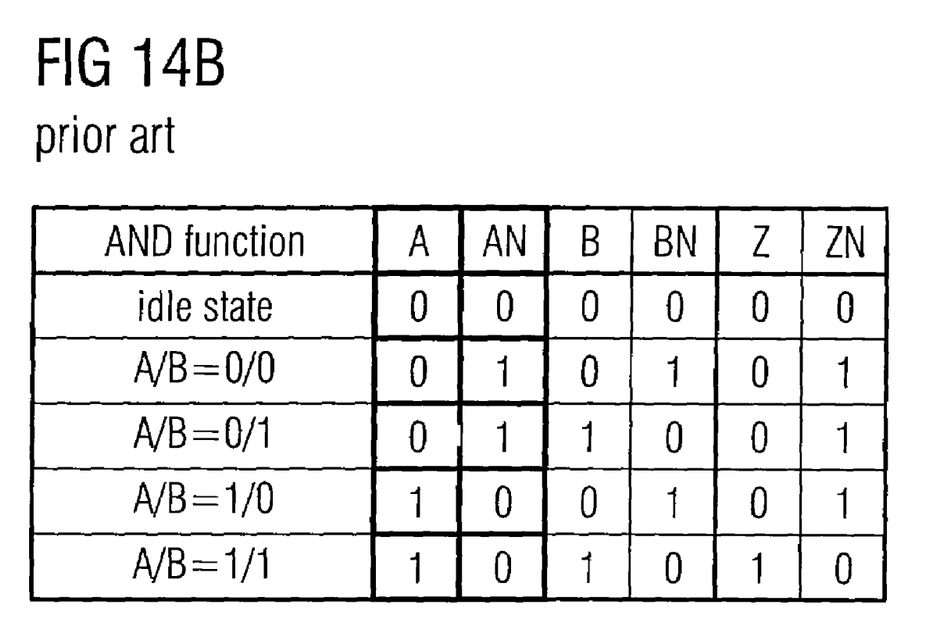

This principle will be explained below by means of an exemplary AND function. FIG. 14a shows a value table for an AND function. A, B are the input signals of the circuitry, and Z is the output of the circuitry. FIG. 14b shows the value table for an implementation of a known circuit for processing dual rail signals with precharge signals. In a precharge cycle, referred to as idle state in FIG. 14b, the input signals A, AN and B, BN have the same logic states, respectively, here logical 0. In this case, the output signals Z, ZN are also set to zero. Thus, if precharge values are present at both inputs of the circuitry, these precharge values are passed through to the output.

According to the value table shown in FIG. 14b, spurious impulses may occur during a transition from a calculation cycle with valid data values to a precharge cycle or during a transition from a precharge cycle to a calculation cycle. This is particularly the case if, during the transition from the calculation cycle to the precharge cycle, the precharge value is already present on one input signal, but a valid data value is still present on the other input signal. In this case, there may already be output a precharge value at the output, but also still a data value. It cannot be excluded either that, during the transition, several different data values are temporarily output at the output, before there are finally output precharge values at the output. The same problem occurs during the transition from the precharge cycle to the calculation cycle. If a valid data value is already present at one of the inputs, while a precharge value is still present at the other input, it is again not decided whether, at the output, there is already present a valid data value, alternating data values or still a precharge value. These insecurities may result in spurious impulses and offer a point of attack for the newest attack scenarios, in which an attempt is made, by a higher time resolution of the current consumption of a circuit, to detect different switching times and then to evaluate the current waveform correspondingly.

BRIEF SUMMARY

The present invention provides a circuit for calculating a logical combination of two input operands, having:

a first input for receiving a first dual rail signal having data values of the first input in a calculation cycle and precharge values in a precharge cycle;

a second input for receiving a second dual rail signal having data values of the second input in the calculation cycle and precharge values in the precharge cycle;

an output for outputting a third dual rail signal having result values in the calculation cycle and precharge values in the precharge cycle;

a logic circuit for determining the result values according to the logical combination from the data values of the first input and the second input and for outputting the result values in the calculation cycle at the output; and a precharge circuit designed to impress precharge values in the output already when precharge values are detected at a single input, or designed to terminate impressing the precharge values only when the first dual rail signal and the second dual rail signal have data values.

The present invention further provides a method for calculating a logical combination of two input operands, having the steps of:

receiving a first dual rail signal at a first input having data values of the first input in a calculation cycle and precharge values in a precharge cycle;

receiving a second dual rail signal at a second input having data values of the second input in the calculation cycle and precharge values in the precharge cycle;

determining result values according to the logical combination from the data values of the first input and the second input and outputting the result values in the calculation cycle at an output for outputting a third dual rail signal having the result values in the calculation cycle and precharge values in the precharge cycle;

impressing precharge values at the output already when precharge values are detected at a single input, or terminating impressing the precharge values only when the first and second dual rail signals have data values.

An advantage of an embodiment of the present invention is to provide a circuit and a method for calculating a logical combination of input operands allowing secure processing of the operands.

BRIEF DESCRIPTION OF THE SEVERAL VIEWS OF THE DRAWING(S)

Embodiments of the present invention will be explained in more detail below with respect to the accompanying drawings, in which.

DETAILED DESCRIPTION

Embodiments of the present invention are based on the finding that a precondition for circuit cells to be resistant to a timing attack is that a transition of the circuit output into the precharge cycle or precharge state, also called idle phase, occurs as soon as a precharge value is present at least at one input, and that a transition of the output of the circuit from the precharge cycle occurs only when there are no more precharge values at all inputs. In the precharge cycle, precharge values, typically values with the same logic states not corresponding to any valid data values, are present on both lines of a dual rail signal.

The proposed circuit technology is meant to prevent the circuit output from already changing in advance when individual input values arrive, even if the logical function would permit this. According to the present invention, the output change is executed only when all input values have passed from the precharge cycle to the evaluated state, referred to as calculation cycle or calculation state below. Thus, the output change for the transition into the calculation cycle is always triggered by the last input and the observability is further reduced. On the other hand, the suggested circuit technology ensures that precharge values are present on the output signal as soon as precharge values are present at a single input.

Due to the defined transitions, spurious impulses, short-term bit changes and undefined switching times allowing an attacker to draw conclusions with respect to data to be processed are avoided.

The gate implementations on which the inventive approach is based are driven at any time, i.e. there is no dynamic state. Thus, libraries based thereon are synthesizable and suitable for static timing analyses.

In the subsequent description of the embodiments of the present invention, the same or like reference numerals are used for the elements illustrated in the various drawings and operating similarly, wherein a repeated description of these elements is omitted.

Figure 1:
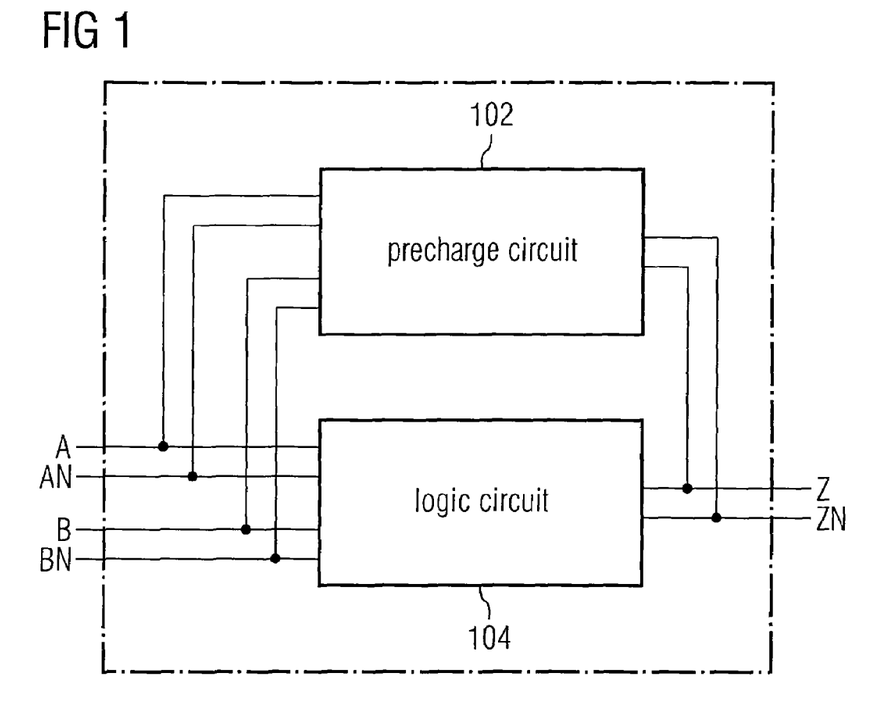
FIG. 1 is a schematic representation of a circuit according to an embodiment of the present invention.

FIG. 1 shows a circuit for calculating a logical combination of two input operands according to an embodiment of the present invention. The circuit is implemented in dual rail circuit technology. Each bit transmitted on a dual rail line is illustrated by two nodes, wherein each bit has a valid logical value when the first one of the two nodes corresponds to the true logical value of this bit and the second one of the two nodes corresponds to the respective inverted value. Such valid logical values will also be referred to as data values in the following. A so-called precharge state, also called "precharge or predischarge", is inserted between two data values with valid logical values 1,0 or 0,1. In such a precharge state, both nodes of the dual rail line are charged to the same electric potential and assume logically invalid values 1,1 or 0,0. Such logically invalid values are referred to as precharge values in the following. In the following embodiments, the states 0,0 are assumed as precharge values. In this case, the states 1,1 are not allowed. Alternatively, the states 0,0 may also be assumed as precharge values. In this case, the states 1,1 are not allowed. Calculation cycles, in which valid data values are present at the circuit, alternate with precharge cycles, in which invalid logical values in the form of precharge values are present at the circuit. If precharge values are present at an input of the circuit, they are passed through to the output of the circuit without requiring an additional clock signal or precharge signal for this. According to the present invention, precharge values are output at the output of the circuit as soon as precharge values are present at least at one input of the circuit. This corresponds to the transition from a calculation cycle, in which valid data values are present at the input of the circuit, to the precharge cycle, in which precharge values are present at least at one input of the circuit. During the transition from the precharge cycle to the calculation cycle, precharge values are output at the output of the circuit until there are no more precharge values at all inputs of the circuit.

The circuit shown in FIG. 1 comprises a precharge circuit 102 and a logic circuit 104. The circuit comprises a first input for receiving a first dual rail signal A, AN, and a second input for receiving the dual rail signal B, BN. The dual rail signals A, AN, B, BN comprise data values in the calculation cycle and precharge values in the precharge cycle. This means that, for example, in the calculation cycle, a 0 is present on the signal A and a 1 is present on the signal AN, or a 1 is present on the signal A and a 0 is present on the signal AN. In the precharge cycle, a 0 or a 1, respectively, is present on the signals A, AN. The circuit further comprises an output for outputting a dual rail signal Z, ZN. Just like the dual rail input signals, the dual rail output signal comprises data values in the calculation cycle and precharge values in the precharge cycle. The dual rail signals A, AN, B, BN are supplied both to the precharge circuit 102 and the logic circuit 104. The logic circuit 104 is designed to perform a logical combination of the values present on the dual rail signals A, AN, B, BN. The result of the logical combination is applied to the output of the circuit by the logic circuit 104 and may be output in the calculation cycle by the dual rail output signal Z, ZN.

The precharge circuit 102 is designed to ensure that the calculation cycle of the dual rail output signal Z, ZN, in which the result values of the logic circuit 104 are output, begins only when none of the input signals A, AN, B, BN comprises precharge values anymore and/or when both of the input signals A, AN, B, BN comprise valid data values. As long as precharge values are still present on one of the input signals A, AN, B, BN and are detected at the input of the circuit, the precharge circuit 102 impresses precharge values on the output signal Z, ZN.

Figure 2:
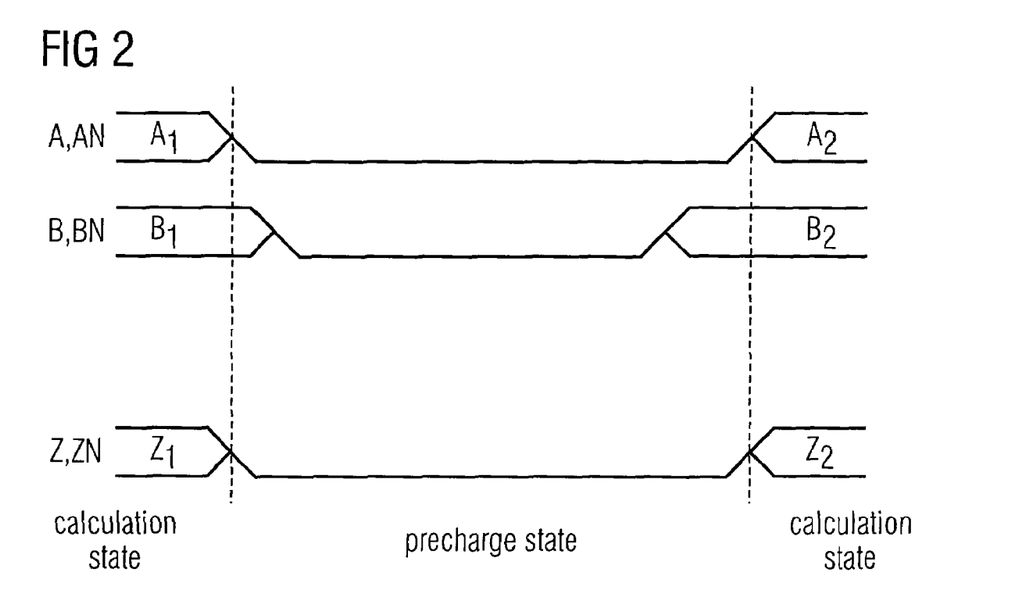
FIG. 2 is a temporal representation of calculation cycles and precharge cycles according to an embodiment of the present invention.

FIG. 2 illustrates a transition from the calculation cycle to the precharge cycle and from the precharge cycle to a further calculation cycle. In the calculation cycle, valid data values, designated $A_1$, $B_1$ and $Z_1$ in FIG. 2, are present on the dual rail input signals A, AN and B, BN and on the dual rail output signal Z, ZN. The signals A, B, Z have a logic state 0 or 1, and the associated inverted signals AN, BN, ZN have the respective inverted logic state 1 or 0. During the transition from the calculation cycle to the precharge cycle, all signals A, AN, B, BN, Z, ZN assume the same logical value, here logical 0.

The inventive approach ensures that the output signal Z, ZN has a precharge value, here logical 0, as soon as the first input signal, in this case the input signal A, AN, assumes the precharge value. This is guaranteed by the precharge circuit 102 shown in FIG. 1. Without this precharge circuit 102, data values could still be present at the output Z, ZN, as long as the second input signal B, BN comprises valid data values. Furthermore, undefined states and spurious impulses could occur in this time period without the precharge circuit 102. The precharge circuit 102 prevents such undefined states on the output signal Z, ZN, which could result in spurious impulses or multiple switching of the output signal Z, ZN. During the transition from the precharge cycle to the calculation cycle, the precharge circuit 102 also ensures that the output signal Z, ZN comprises precharge values as long as precharge values are still present on at least one of the input signals. In this case, this means that the output signal Z, ZN assumes valid data values only when, following the second input signal B, BN, the first input signal A, AN has also assumed valid data values. The precharge circuit 102 thus prevents the output from already changing in advance when individual input values arrive, even if the logical function would allow this. The output change is performed only when all input values have passed from the precharge state to the evaluated state.

At the moment in which the precharge circuit 102 sets both inputs to logical 0 on the output side, there is no pull down state in the logic circuit 104. This avoids a short circuit.

Figure 3:
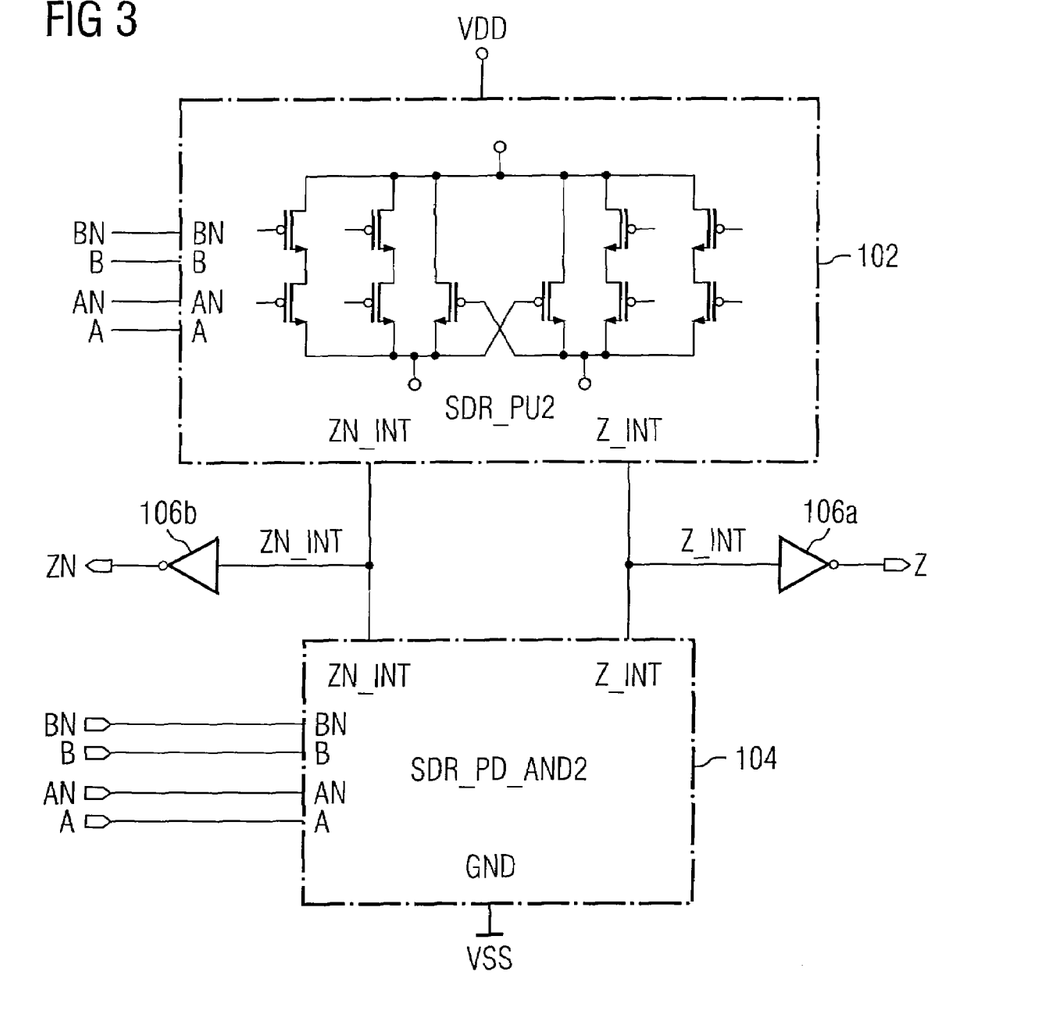
FIG. 3 is a schematic representation of a circuit according to a further embodiment of the present invention.

FIG. 3 shows a further block circuit diagram of a circuit for calculating a logical combination of two input operands according to the present invention. The inventive circuit again comprises a precharge circuit 102 and a logic circuit 104, both designed to receive the dual rail signals A, AN and B, BN. The precharge circuit 102 and the logic circuit 104 are connected to a dual rail intermediate node Z_INT, ZN_INT on the output side. Furthermore, the circuit comprises a first inverter 106a and a second inverter 106b connected between the output of the circuit and the intermediate node. The first inverter 106a is designed to invert a logic state of the first node Z_INT of the intermediate node and to output it as output signal Z at the output of the circuit. The second inverter 106b is designed to invert a logic state of the second node ZN_INT of the intermediate node and to output it as output signal ZN at the output of the circuit.

In this embodiment, a logic first state "1" is physically realized by a high voltage potential VDD, and a second logic state "0" is physically realized by a low voltage potential VSS and/or GND.

The precharge circuit 102 is realized as pull-up network impressing the high voltage potential VDD on the intermediate node Z_INT, ZN_INT depending on the input signals A, AN, B, BN. For this purpose, the precharge circuit 102 is connected to a first high potential terminal VDD.

In this embodiment, the logic circuit 104 is realized as pull-down network designed to pull the intermediate node Z_INT, ZN-INT to the low electric potential depending on the input signals A, AN, B, BN. For this purpose, the logic circuit 104 is connected to a second low potential terminal, in this case a ground terminal VSS.

The logic circuit 104 may, for example, be a logic circuit performing a logical AND operation and/or combination of the operands transmitted via the input signals A, AN, B, BN.

Figure 4A:
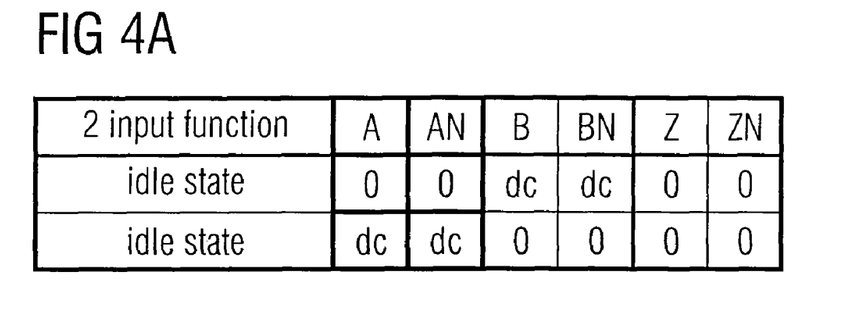
FIGS. 4a, 4b show value tables for a precharge state according to an embodiment of the present invention.
Figure 4B:
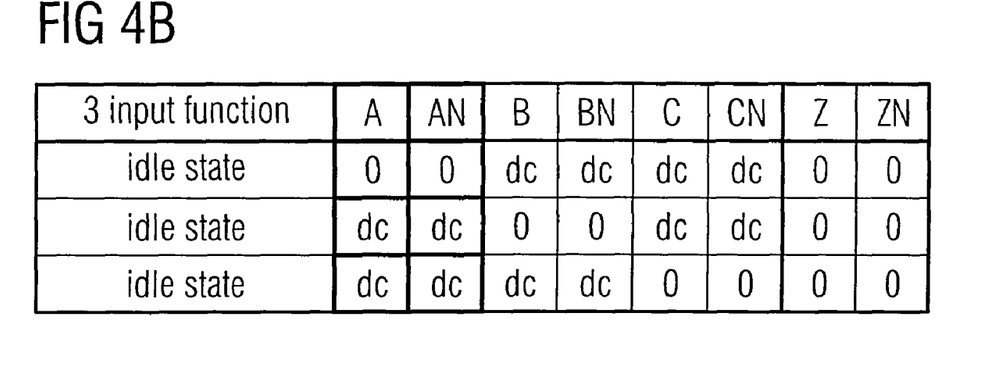

FIGS. 4a and 4b show general value tables describing a precharge state. FIG. 4a relates to two input signals A, AN, B, BN, and FIG. 4b relates to three input signals A, AN, B, BN, C, CN.

Figure 4C:
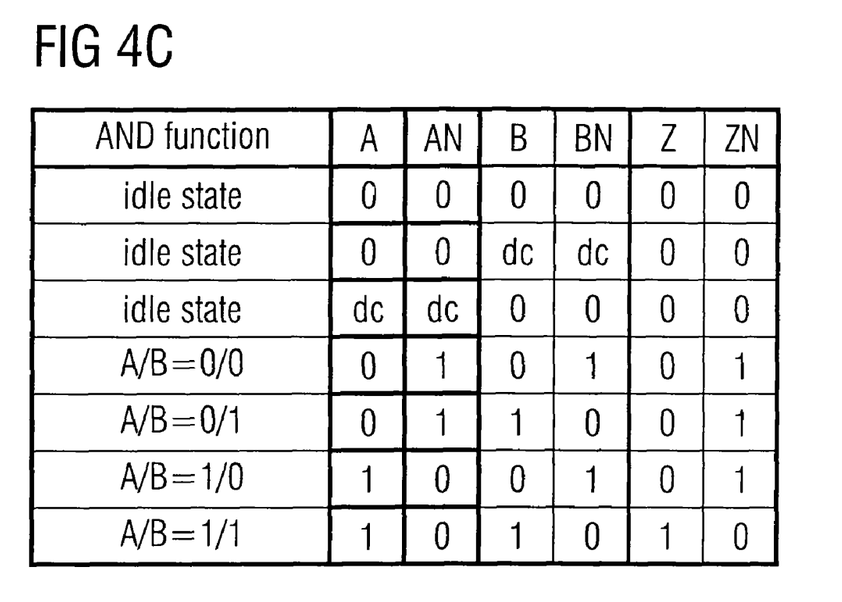
FIG. 4c shows a value table of a logical combination according to an embodiment of the present invention.

FIG. 4c shows a value table on which an AND operation and/or combination is based.

According to the inventive approach, the static dual rail value table shown in FIG. 14b is extended by the two rows shown in FIG. 4a. Accordingly, the output signals Z, ZN are in the precharge state or idle state when precharge values are present on at least one of the input signals A, AN, B, BN. Thus, it is sufficient that the precharge state is respectively present on the input signals A, AN to output the precharge state on the output signals Z, ZN, too. The logic state of the signals B, BN is ignored. This is shown in the value table by entering don't care (dc) for the signals B, BN. Correspondingly, precharge values are already output at the output Z, ZN when the second input signal B, BN is in the precharge state, irrespective of whether data values or precharge values are present on the first input signal A, AN.

FIG. 4b shows a corresponding table for a three input logic in which the inventive circuit comprises three inputs for receiving three dual rail input signals. In this case, the output signal Z, ZN is formed of a logical combination of the three input signals A, AN, B, BN, C, CN. Again it is sufficient that one of the input signals, for example the first input signal A, AN, is in the precharge state for precharge values to be output on the output signal Z, ZN. In this case, the other two input signals B, BN, C, CN do not have to be considered.

Again "dc" means don't care and represents a logical 0 or a logical 1, wherein the combination logical 1, logical 1 is not allowed for an input pair.

FIG. 4c shows the extended table of the AND function according to the inventive approach. The extension particularly relates to the second and third rows described based on FIG. 4a.

The inventive approach has been explained exemplarily based on a value table for an AND function. Corresponding value tables may also be created for other logical functions.

Figure 5:
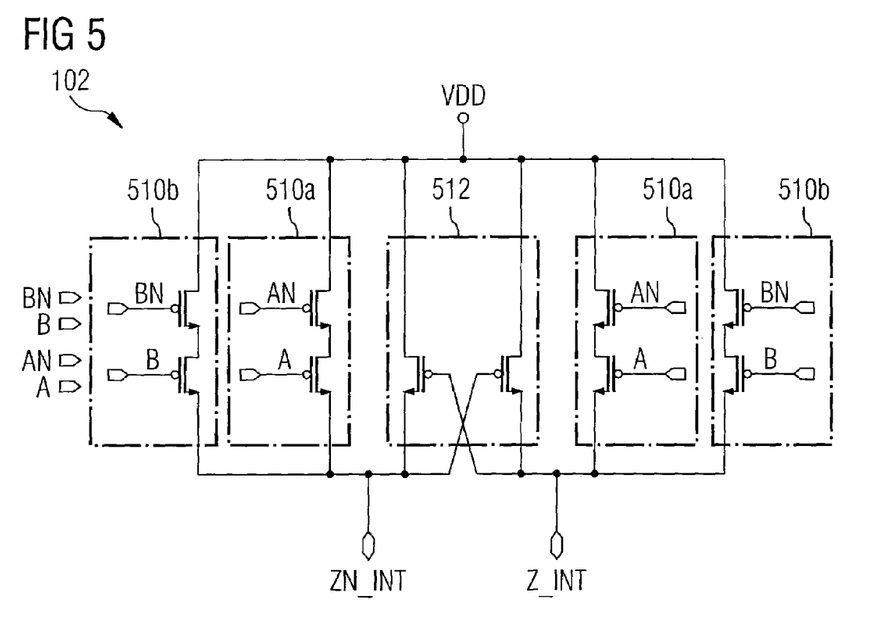
FIGS. 5 and 6 show circuit diagrams of precharge circuits according to embodiments of the present invention.

FIG. 5 shows a detailed circuit diagram of a precharge circuit 102, such as it may be used for the embodiment described based on FIG. 3. The precharge circuit 102 is a transistor circuit realizing a pull-up network. Depending on the dual rail input signals A, AN, B, BN, the precharge circuit 102 pulls the nodes of the dual rail intermediate node Z_INT, ZN_INT to the high voltage potential VDD. If precharge values, i.e. in this case a low voltage potential, are present on one of the input signals A, AN and B, BN, respectively, for example on the signal A and the signal AN, the precharge circuit 102 passes the high voltage potential from the potential terminal VDD through to both nodes of the intermediate node Z_INT, ZN-INT. For this purpose, the precharge circuit 102 comprises comparing means 510a, 510b designed to pass the high voltage potential VDD through to the intermediate node Z_INT, ZN_INT when precharge values are present on one of the input signals A, AN, B, BN. According to this embodiment, comparing means, for example the comparing means 510a, comprises two transistors connected in series. The source terminal of the first transistor is connected to the high voltage potential VDD, and the drain terminal of the second transistor is connected to the intermediate node Z_INT and ZN_INT, respectively. The gate terminal of the first transistor is driven by the signal AN of the first dual rail input signal A, AN, and the gate terminal of the second transistor is driven by the signal A of the dual rail input signal A, AN. The transistors are transistors of the p-type. Both transistors thus connect through when the low voltage potential is present at both gate terminals. If a high voltage potential is present at one of the gate terminals, as it is the case when a valid data value is present on the input signal A, AN, the comparing means 510*a* blocks. The second comparing means 510*b* is connected in parallel to the first comparing means 510*a* and is driven by the second dual rail input signal B, BN. The comparing means 510*a*, 510*b* are respectively implemented twice to drive both intermediate nodes Z_INT, ZN_INT.

If a valid data value is present on both input signals A, AN, B, BN, both comparing means 510*a*, 510*b* block. In order to apply a valid data value to the intermediate node Z_INT, ZN_INT, it is required, however, that a node of the intermediate node Z_INT, ZN_INT is connected to the high voltage potential VDD. For this purpose, the precharge circuit 102 comprises a holding member 512 consisting of two transistors connected to the high voltage potential VDD at their source inputs and to the node ZN_INT and the node Z_INT, respectively, of the intermediate node at their drain outputs. The gate terminals are respectively driven by the other node of the intermediate node ZN_INT, Z_INT than the node with which the drain terminal of the respective transistor is connected. The transistors are also transistors of the p-type. The holding member 512 guarantees that one of the nodes of the intermediate node Z_INT, ZN_INT is held at the high voltage potential VDD as soon as the other node is pulled to a low voltage potential VSS by the logic circuit 104.

Figure 6:
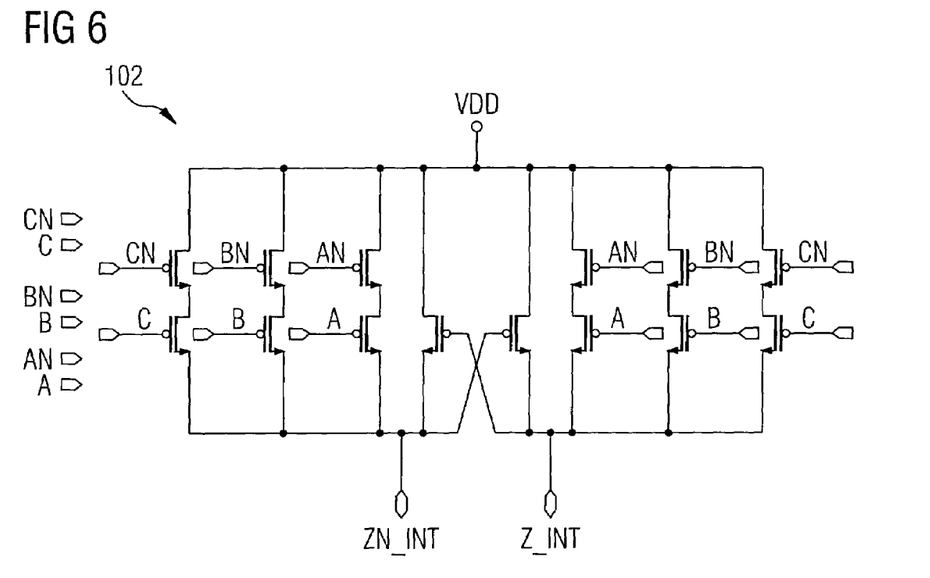

FIG. 6 shows a further precharge circuit 102 for an inventive circuit with three inputs A, AN, B, BN, C, CN. Unlike the precharge circuit shown in FIG. 5, the precharge circuit 102 shown in FIG. 6 comprises a further comparing means ensuring that the intermediate node Z_INT, ZN_INT is connected to the high voltage potential VDD, as soon as precharge values are present on the third input signal C, CN.

Figure 7:
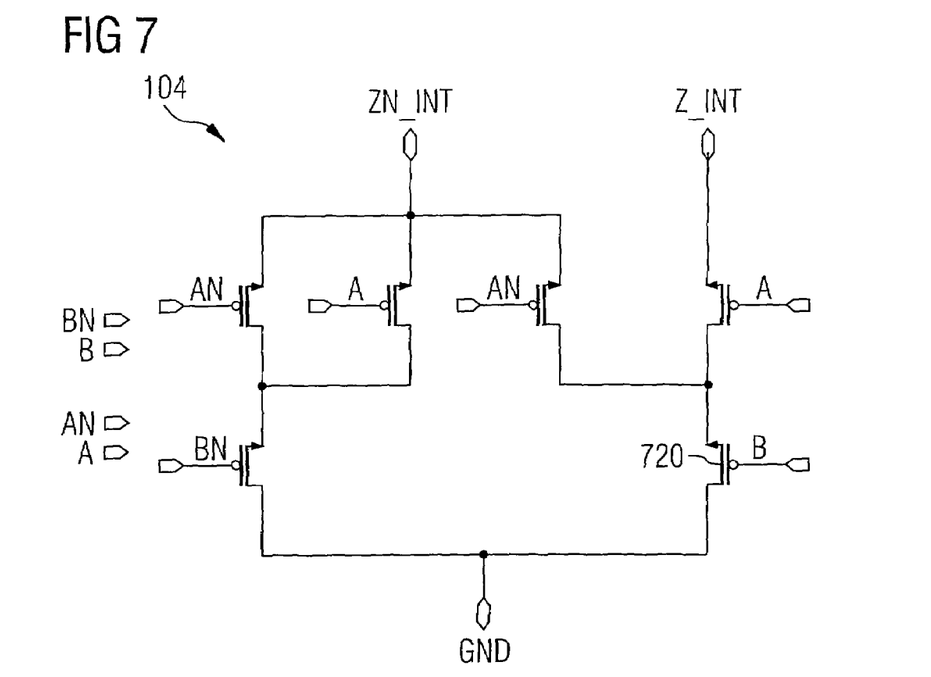
FIGS. 7, 8, 9a, 9b, and 10 to 13 show circuit diagrams of logic circuits according to embodiments of the present invention.
Figure 8:
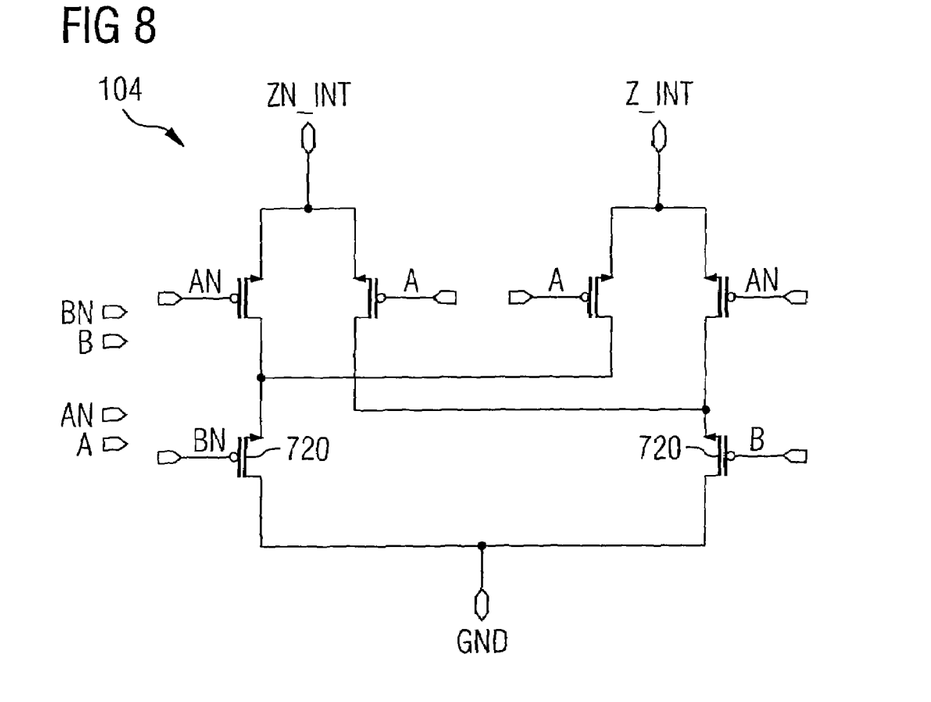

FIGS. 7 to 13 show embodiments of logic circuits 104 as they may be used for the embodiment described in FIG. 3. Here, the logic circuits described in FIGS. 7 and 8 are designed for combining two input signals, and the logic circuits 104 shown in FIGS. 9 to 13 are designed for combing three input signals. Accordingly, the logic circuits 104 shown in FIGS. 7 and 8 may be used together with the precharge circuit shown in FIG. 5, and the logic circuits 104 shown in FIGS. 9 to 13 may be used with the precharge circuit 102 shown in FIG. 6. The logic circuits 104 shown in FIGS. 7 to 13 are realized as transistor circuits realizing a pull-down network. Transistors of the N-type are used. The logic circuits 104 are connected between a second potential terminal with a ground potential GND and/or VSS and the intermediate node Z_INT, ZN_INT. The gate terminals of the transistors used in the logic circuits 104 shown in FIGS. 5 to 13 and in the precharge circuits 102 are driven by the input signals A, AN, B, BN and/or the further input signals in the case of circuits for three input signals. According to the embodiments shown in FIGS. 5 to 13, the precharge circuits 102 and the logic circuits 104 are implemented as stand-alone circuits that do not comprise any common transistors.

The logic circuits 104 shown in FIGS. 7 to 13 are designed to interrupt a connection between the low potential terminal GND and the intermediate nodes Z_INT, ZN_INT, as soon as precharge values are present on at least one of the input signals A, AN, B, BN. However, if there are valid data values on all input signals A, AN, B, BN, the logic circuits 104 shown are designed to connect one of the nodes of the intermediate node Z_INT, ZN_INT to the low voltage potential GND corresponding to the logical combination to be realized and thus to output a valid data value.

FIG. 7 shows a logic circuit 104 in the form of a transistor circuit for realizing an AND operation and/or combination.

The transistor circuit 104 comprises a discharge transistor 720, that may be used both for discharging the node Z_INT and for discharging the node ZN_INT. In different connections, such common transistors 720 are also used in the further embodiments of FIGS. 8 to 13 to reduce the required number of transistors.

According to the embodiment of a logic circuit 104 for realizing an AND combination, shown in FIG. 7, the node Z_INT is connected to the low voltage potential GND when the input signals A, B comprise a logical 1. The second node ZN_INT is connected to the low voltage potential GND when a logical 1 is present on the input signals BN, AN, the input signals BN, A, or the input signals AN, B. In the other cases, the intermediate nodes Z_INT, ZN_INT are not connected to the low voltage potential GND.

The intermediate node ZN_INT is connected to the drain terminals of three transistors, wherein the first transistor is driven by the signal AN, and the second transistor is driven by the signal A. The source terminals of these two transistors are connected to ground potential GND via a further transistor driven by the signal BN. The third transistor is driven by the signal AN and is connected to the common transistor 720 via its source terminal, the common transistor being driven by the signal B and being connected to ground potential GND with its source terminal. The drain terminal of the common transistor 720 is connected to the node Z_INT via a further transistor driven by the signal A.

FIG. 8 shows a logic circuit 104 according to a further embodiment realizing a logical XOR combination of two input signals A, AN, B, BN. The structure of this logic circuit corresponds to the structure of the logic circuit shown in FIG. 7, wherein the logic circuit 104 shown in FIG. 8 connects the first node Z_INT to the low voltage potential GND according to the XOR combination when a logical 1 is present on the input signals AN, B or on the input signals A, BN. The second intermediate node ZN_INT is connected to the low voltage potential GND when a logical 1 is present on the input signals AN, BN and on the input signals A, B, respectively. In all other cases, the intermediate nodes Z_INT, ZN_INT are not connected to the low voltage potential GND.

The node ZN_INT is connected to the ground potential GND via a series connection of two transistors whose gate terminals are driven by the signal AN and the signal BN, respectively. The node Z_INT is connected to the ground potential GND via a series connection of two transistors driven, at their gate terminals, by the signal AN and the signal B, respectively. The drain terminals of the common transistors 720 are connected to the nodes Z_INT and ZN_INT, respectively, via a further transistor driven by the signal A.

Figure 9A:
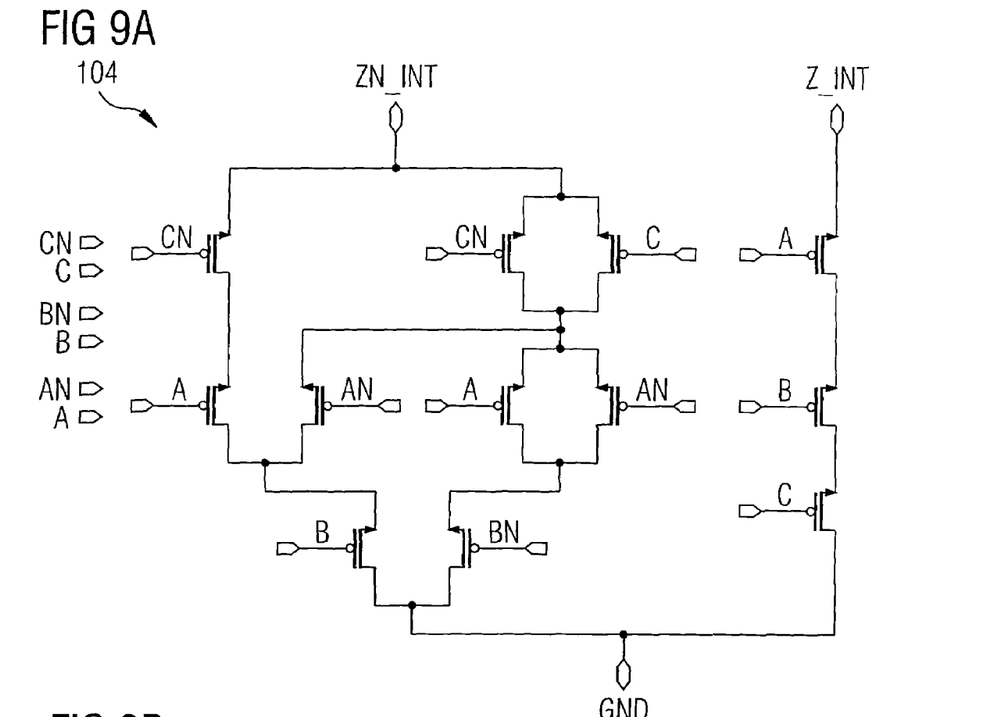
Figure 9B:
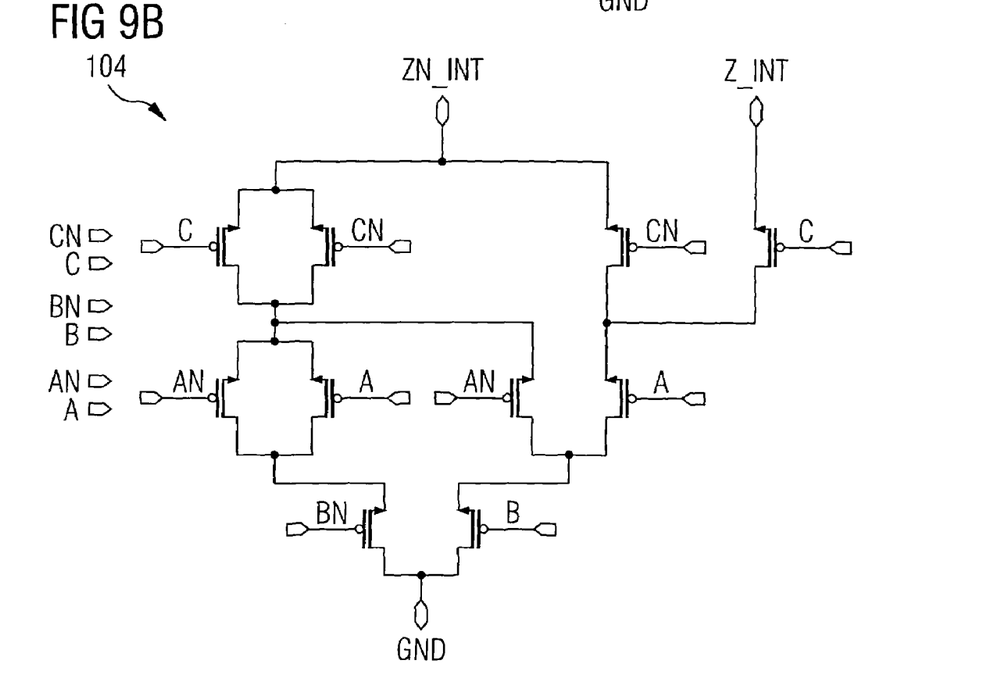

FIGS. 9*a* and 9*b* show further embodiments of a logic circuit 104 designed to perform an AND combination between three input signals A, AN, B, BN, C, CN. As compared to the transistor circuit shown in FIG. 9*a*, the transistor circuit shown in FIG. 9*b* is optimized with respect to the number of used transistors.

Figure 10:
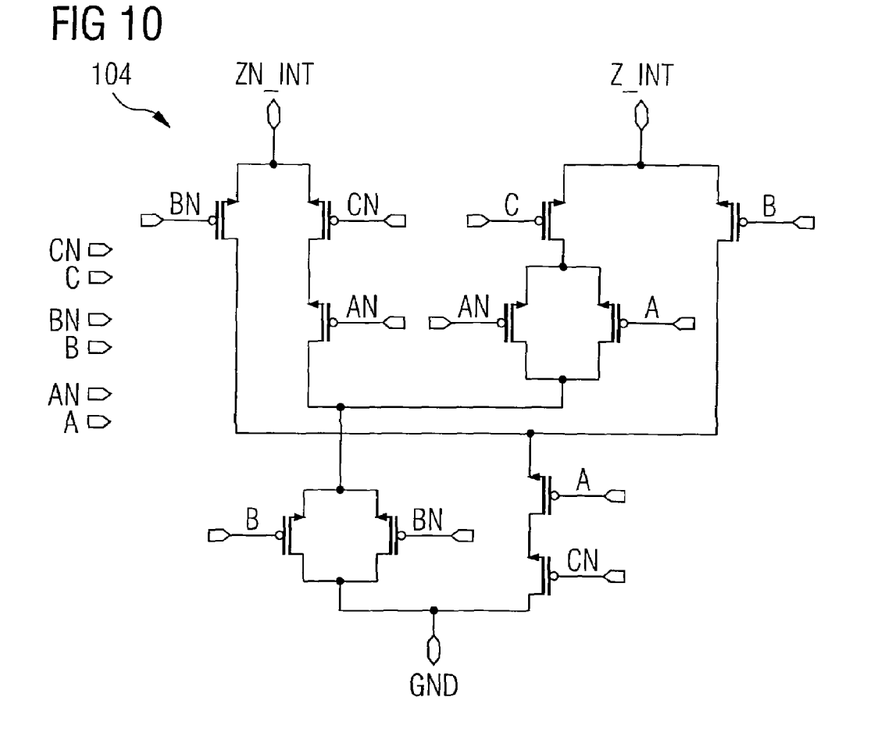

FIG. 10 shows a logic circuit 104 of a further embodiment performing a logical AND-OR combination between three input signals A, AN, B, BN, C, CN.

Figure 11:
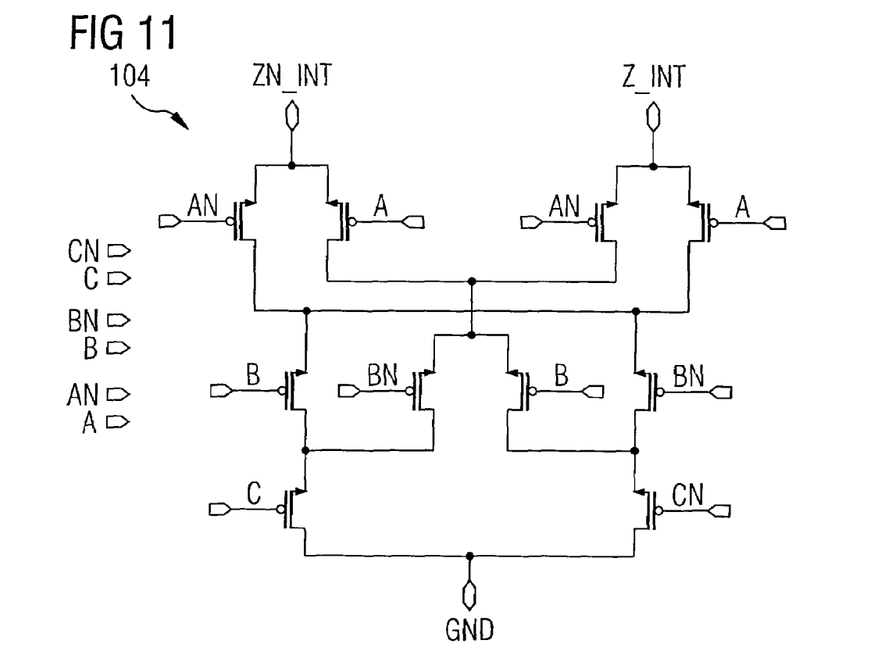

FIG. 11 shows a further embodiment of a logic circuit 104 designed to perform a logical XOR combination between three input signals A, AN, B, BN, C, CN.

Figure 12:
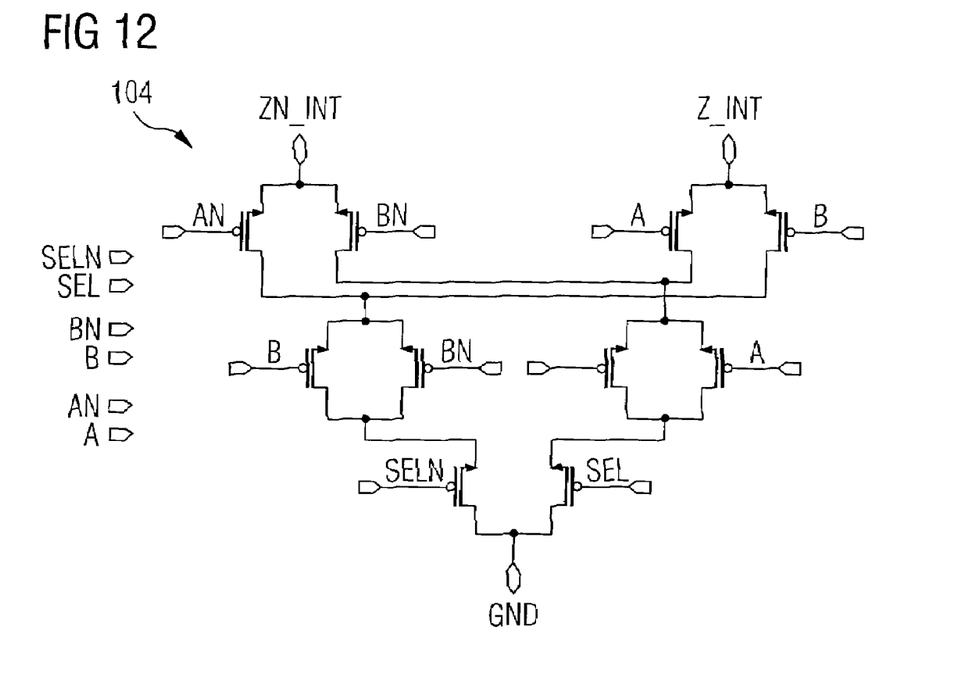

FIG. 12 shows a further embodiment of a logic circuit 104 designed to perform a multiplexer combination between two input signals A, AN, B, BN and a select signal SEL, SELN.

Figure 13:
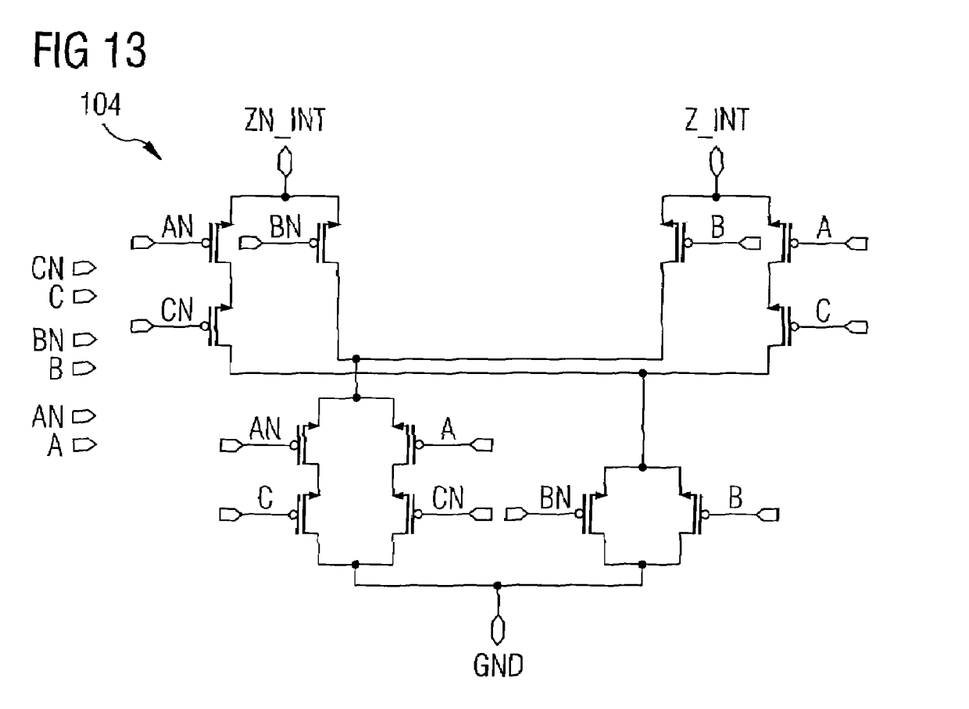

FIG. 13 shows a further embodiment of a logical combination 104 designed to perform a majority combination between three input signals A, AN, B, BN, C, CN.

The exact connection of the transistors used in FIGS. 5 to 13 is apparent from the corresponding figures.

The circuits 102, 104 shown in FIGS. 5 to 13 may be used for the inventive circuit, as it is illustrated as block circuit diagram in FIG. 3. For this purpose, the inverters shown in FIG. 3 are used to invert a logic state of the intermediate nodes Z_INT, ZN_INT and to output it at the output as result signal Z, ZN.

All gates in a library based on this embodiment have the same structure subdivided into three groups. A pull-down network 104 implements the logic functionality. A pull-up network 102 implements the precharge functionality, i.e. precharging the output signals. The pull-up network is constructed equally for all gates with the same number of inputs. The third group is made up of the two output inverters.

Due to the pull-up network, the precharge state is always defined as long as at least one input is in the precharge state.

Due to the pull-down network, only either the ZN_INT node or the Z_INT node is discharged in the evaluation case, i.e. the calculation cycle. The pull-down networks are designed so that a maximum of only one path is connected through to the low voltage potential, i.e. to VSS, because otherwise different discharge currents would flow for different input combinations.

The networks for discharging the nodes ZN_INT and Z_INT, respectively, may partially use the same transistors 720, as far as the function allows this, for example the two transistors whose source terminal is connected to the ground potential in the pull-down network 104 shown in FIG. 8 for the implementation of an XOR functionality.

Since, with the dual rail circuit technologies, one of the two output signals is always at 0 and the other one at 1 in the evaluation state, a logical inversion of the gate may be achieved by exchanging the two output lines Z, ZN. If, in addition, the input pairs A, AN and B, BN are also exchanged, all possible logic functions with two inputs may be mapped with two different pull-down networks. The mapping of all logic functions with three inputs requires only five structures.

Functions with more inputs may be realized correspondingly. The inventive approach may be extended to circuits with four or more inputs for receiving further dual rail signals.

The transistor circuits shown in FIGS. 5 to 13 are exemplary and may be substituted by circuits having the same functionality. Equally, the present invention is not limited to the shown transistor logic. The logical combinations may be, for example, AND, NAND, OR, NOR, XOR, NXOR, ANDOR, ORAND, multiplexer or majority functions.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A circuit for calculating a logical combination of two input operands, comprising:

a first input for receiving a first dual rail signal comprising data values of the first input in a calculation cycle and precharge values in a precharge cycle;

a second input for receiving a second dual rail signal comprising data values of the second input in the calculation cycle and precharge values in the precharge cycle;

an output for outputting a third dual rail signal comprising result values in the calculation cycle and precharge values in the precharge cycle;

a logic circuit for determining the result values according to the logical combination from the data values of the first input and the second input and for outputting the result values in the calculation cycle at the output; and a precharge circuit capable of impressing precharge values in the output already when precharge values are detected at a single input, or capable of terminating impressing the precharge values only when the first dual rail signal and the second dual rail signal comprise data values.

2. The circuit of claim 1, wherein each dual rail signal comprises a first signal and a second signal, and wherein the first and second signals of the dual rail signals respectively have the same logic states for precharge values and logic states inverted with respect to each other for data values and/or result values.

3. The circuit of claim 1, wherein dual rail signals have the same precharge values in the precharge cycle.

4. The circuit of claim 1, wherein the logical combination is an AND combination according to the value table

| A  | AN | B  | BN | Z | ZN |
|----|----|----|----|---|----|
| 0  | 0  | dc | dc | 0 | 0  |
| dc | dc | 0  | 0  | 0 | 0  |
| 0  | 1  | 0  | 1  | 0 | 1  |
| 0  | 1  | 1  | 0  | 0 | 1  |
| 1  | 0  | 0  | 1  | 0 | 1  |
| 1  | 0  | 1  | 0  | 1 | 0  | wherein the placeholder (dc) represents either of the logic states 1 or 0.

5. The circuit of claim 1, further comprising a first potential terminal for a high potential and a second potential terminal for a low potential;

wherein the logic circuit is a pull-down network connected between the second potential terminal and a dual rail intermediate node and capable of impressing the lower potential to a node of the dual rail intermediate node when precharge values are detected neither at the first input nor at the second input; and wherein the precharge circuit is a pull-up network connected between the first potential terminal and the dual rail intermediate node and capable of impressing the high potential to both nodes of the dual rail intermediate node, as long as the precharge values are detected at least at a single input; and an inverter pair connected between the dual rail intermediate node and the output and capable of providing logic states of the dual rail intermediate node corresponding to the high potential or the low potential, respectively, in an inverted way as third dual rail signal at the output.

6. The circuit of claim 5, wherein the precharge circuit comprises first comparators and second comparators, wherein the first comparators are capable of impressing precharge values onto both nodes of the intermediate node when the first signal and the second signal of the first dual rail signal comprise the same logical values, and wherein the second comparators are capable of impressing precharge values onto both nodes of the intermediate node when the first signal and the second signal of the second dual rail signal comprise the same logical values.

7. The circuit of claim 5, wherein the precharge circuit comprises a holding member capable of holding one of the nodes of the dual rail intermediate node at the high potential when the low potential is impressed to the other node of the dual rail intermediate node by the logic circuit.

8. The circuit of claim 1, wherein the logic circuit and the precharge circuit are respectively realized as transistor circuits, and the transistor circuit of the logic circuit and the transistor circuit of the precharge circuit do not comprise any shared transistors.

9. The circuit of claim 8, wherein the logic circuit comprises a discharge transistor capable of impressing the low potential to one node of the dual rail intermediate node in a first calculation cycle and of impressing the low potential to the other node of the dual rail intermediate node in a second calculation cycle.

10. The circuit of claim 1, wherein the logical combination is an AND, NAND, OR, NOR, XOR, NXOR, ANDOR, ORAND, multiplexer or majority function.

11. The circuit of claim 1, further comprising a further input for receiving one or more further dual rail signals comprising data values of the further input in the calculation cycle and precharge values in the precharge cycle;
   wherein the logic circuit is capable of determining the result values according to the logical combination from the data values of the first, second and further dual rail signals; and
   wherein the precharge circuit is capable of terminating impressing the precharge values only when the first, second and further dual rail signals comprise data values.

12. A method for calculating a logical combination of two input operands, comprising:
   receiving a first dual rail signal at a first input comprising data values of the first input in a calculation cycle and precharge values in a precharge cycle;
   receiving a second dual rail signal at a second input comprising data values of the second input in the calculation cycle and precharge values in the precharge cycle;
   determining result values according to the logical combination from the data values of the first input and the second input and outputting the result values in the calculation cycle at an output for outputting a third dual rail signal comprising the result values in the calculation cycle and precharge values in the precharge cycle; and
   impressing precharge values at the output already when precharge values are detected at a single input, or terminating impressing the precharge values only when the first and second dual rail signals comprise data values.

13. A device for calculating a logical combination of two input operands, comprising:
   first means for receiving a first dual rail signal comprising data values of the first means in a calculation cycle and precharge values in a precharge cycle;
   second means for receiving a second dual rail signal comprising data values of the second means in the calculation cycle and precharge values in the precharge cycle;
   means for outputting a third dual rail signal comprising result values in the calculation cycle and precharge values in the precharge cycle;
   logic means for determining the result values according to the logical combination from the data values of the first means and the second means and for outputting the result values in the calculation cycle at the means for outputting; and
   precharge means for impressing precharge values in the means for outputting already when precharge values are detected at a single means for receiving, or for terminating impressing the precharge values only when the first dual rail signal and the second dual rail signal comprise data values.

* * * * *

UNITED STATES PATENT AND TRADEMARK OFFICE
CERTIFICATE OF CORRECTION

PATENT NO. : 7,342,423 B2 Page 1 of 1
APPLICATION NO. : 11/463190
DATED : March 11, 2008
INVENTOR(S) : Antoine Degrendel et al.

It is certified that error appears in the above-identified patent and that said Letters Patent is hereby corrected as shown below:

In the Specification:

At column 4, lines 41-46, delete "The logic circuit……...output signal Z, ZN." and insert same on line 42 below "circuit 104." as page a new paragraph.

At column 5, line 57, "ZN-INT" should read --ZN_INT--

At column 6, line 49, "ZN-INT" should read --ZN_INT--

Signed and Sealed this

Nineteenth Day of August, 2008

JON W. DUDAS
*Director of the United States Patent and Trademark Office*